United States Patent
Li et al.

(10) Patent No.: US 12,319,582 B2
(45) Date of Patent: Jun. 3, 2025

(54) METHOD OF MAKING AEI-TYPE ZEOLITES HAVING A HIGH SILICA TO ALUMINA MOLAR RATIO (SAR)

(71) Applicant: Pacific Industrial Development Corporation, Ann Arbor, MI (US)

(72) Inventors: Yunkui Li, Ann Arbor, MI (US); De Gao, Troy, MI (US); David Shepard, Canton, MI (US); Wei Wu, Ann Arbor, MI (US); Jeffery Lachapelle, Northville, MI (US); Geng Zhang, Utsunomiya (JP)

(73) Assignee: Pacific Industrial Development Corporation, Ann Arbor, MI (US)

( * ) Notice: Subject to any disclaimer, the term of this patent is extended or adjusted under 35 U.S.C. 154(b) by 1002 days.

(21) Appl. No.: 17/290,794

(22) PCT Filed: Nov. 4, 2019

(86) PCT No.: PCT/US2019/059611
§ 371 (c)(1),
(2) Date: May 3, 2021

(87) PCT Pub. No.: WO2020/096935
PCT Pub. Date: May 14, 2020

(65) Prior Publication Data
US 2021/0403334 A1 Dec. 30, 2021

Related U.S. Application Data

(60) Provisional application No. 62/755,598, filed on Nov. 5, 2018.

(51) Int. Cl.
*C01B 39/48* (2006.01)

(52) U.S. Cl.
CPC .......... *C01B 39/48* (2013.01); *C01P 2002/72* (2013.01); *C01P 2004/03* (2013.01); *C01P 2006/12* (2013.01)

(58) Field of Classification Search
None
See application file for complete search history.

(56) References Cited

U.S. PATENT DOCUMENTS

| 3,306,938 A | * | 2/1967 | Nashu ..................... C07C 37/86 |
| | | | 568/702 |
| 3,394,059 A | * | 7/1968 | Young ..................... C25B 3/23 |
| | | | 205/338 |

(Continued)

FOREIGN PATENT DOCUMENTS

| CN | 1161030 A | * | 10/1997 | ......... B01D 67/0044 |
| CN | 102015808 A | * | 4/2011 | ............. C08G 18/16 |

(Continued)

OTHER PUBLICATIONS

"Material Safety Data Sheet for Tetramethylphosphonium Bromide, 98%". Acros Organics, Nov. 20, 2008. Viewed on Aug. 1, 2024 at https://fscimage.fishersci.com/msds/99009.htm.*

(Continued)

*Primary Examiner* — Daniel Berns
(74) *Attorney, Agent, or Firm* — Dickinson Wright PLLC

(57) ABSTRACT

A method of forming AEI-type zeolites in a hydrothermal synthesis without the use of hydrogen fluoride (HF) and in the presence of an FAU zeolite NaY with SAR ≤5, a Y zeolite with a SAR ≥5, or a combination thereof. A gel composition formed upon using this method includes one or more sources of silica, alumina, organic structure directing agents (OSDA), and alkali metal ions; zeolite seeds; and water. This gel composition is defined by the molar ratios of: $SiO_2/Al_2O_3$ 18:1 to 100:1; $M_2O/SiO_2$ 0.15:1 to 0.30:1; $ROH/SiO_2$ 0.05:1 to 0.13:1; and $H_2O/SiO_2$ 5:1 to 20:1;

(Continued)

wherein M is the alkali metal ion and R is an organic moiety derived from the OSDA. This gel composition, after reacting at a temperature between 135° C. to about 200° C. for 10 hours to 168 hours forms the crystalline AEI-type zeolite having a silica to alumina ratio ($SiO_2:Al_2O_3$) that is greater than 15:1.

19 Claims, 7 Drawing Sheets

(56) References Cited

U.S. PATENT DOCUMENTS

| | | | | |
|---|---|---|---|---|
| 3,475,226 | A | * 10/1969 | Fraioli | H01M 50/609 |
| | | | | 429/118 |
| 3,734,840 | A | * 5/1973 | Passal | C25D 3/14 |
| | | | | 205/279 |
| 7,550,613 | B2 | * 6/2009 | Bryhn | A61P 9/10 |
| | | | | 554/220 |

FOREIGN PATENT DOCUMENTS

| | | |
|---|---|---|
| CN | 107285333 A | 10/2017 |
| CN | 107285334 A | 10/2017 |
| CN | 107376989 A | 11/2017 |
| CN | 107635920 A | 1/2018 |
| CN | 107922206 A | 4/2018 |
| EP | 3345869 A1 | 7/2018 |
| JP | 2016050142 A | 4/2016 |
| JP | 2016064975 A | 4/2016 |
| WO | 2017083606 A1 | 5/2017 |

OTHER PUBLICATIONS

European Patent Office, Rijswijk, Netherlands, International Search Report of International Application No. PCT/US2019/059611, Mailed Feb. 21, 2020, 3 pages.

Martin, Nuria et al., Efficient Synthesis of the Cu-SSZ-39 Catalyst for DeNOx Applications, Chemical Communications, vol. 51, No. 55, Jan. 1, 2015, 4 pages., XP55541875.

Maruo, Toshihiro et al., Facile Synthesis of AEI Zeolites by Hydrothermal Conversion of FAU Zeolites in the Presence of Tetraethylphosphonium Cations, Chemistry Letters, vol. 43, No. 3, Jan. 1, 2014, 3 pages, XP055279856.

* cited by examiner

METHOD OF MAKING AEI-TYPE ZEOLITES HAVING A HIGH SILICA TO ALUMINA MOLAR RATIO (SAR)

CROSS REFERENCE TO RELATED APPLICATIONS

This application is a national stage filing of International Application No. PCT/US2019/059611 filed on Nov. 4, 2019, designating the United States and published in English, which claims the benefit of the filing date under 35 U.S.C. § 119(e) of U.S. Provisional Application No. 62/755,598 filed on Nov. 5, 2018, the entire contents of which are both incorporated herein by reference in their entirety.

This disclosure relates generally to a method of making an AEI-type zeolite that exhibits a high silica to alumina molar ratio (SAR), the AEI-type zeolites formed according to said method, and the gel compositions formed during and used in the method of making the AEI-type zeolites.

The statements in this section merely provide background information related to the present disclosure and may not constitute prior art. Microporous zeolites, which contain three-dimensional channels, play an important role in the selective catalytic reduction (SCR) of exhaust emissions arising from diesel engines. An AEI-type zeolite represents one type of aluminosilicate zeolite that may be used as a catalyst support in this application due to its small cage opening size and hence high hydrothermal stability.

AEI-type zeolites may be synthesized using an FAU zeolite Y as a building unit due to the fast hydrothermal conversion of its double 6 members rings to an AEI-type structure. AEI-type zeolites may also be synthesized using a Y zeolite having a high silica to alumina ($SiO_2:Al_2O_3$) ratio. However, such a synthetic method is susceptible to the formation of AEI-type zeolites at low yields (e.g., not greater than 25%) and at a high cost due to the use of a large amount of expensive organic structure directional agents (OSDA). This method typically uses a molar ratio of OSDA:SiO2 that is greater than 0.14. Thus, in order to counter the expense associated with the OSDA, the method generally requires reuse of the mother liquid, which contains unused OSDA, in the preparation of subsequent batches.

AEI-type zeolites may also be synthesized from alumina and silica precursors in the presence of hydrofluoric acid. Typically, the use of hydrofluoric (HF) acid inhibits the inclusion of aluminum in the zeolite structure, thereby resulting in zeolites having a silica to alumina ($SiO_2:Al_3O_4$) ratio in excess of 200. Hydrofluoric acid (HF) is generally impractical for use in industrial processes, particularly, when conducted at an elevated temperature, due to the extreme consequences associated with human contact thereof.

SUMMARY

This disclosure relates generally to an inexpensive method of making an AEI-type zeolite that has a high silica to alumina ratio (SAR), the AEI-type zeolites formed according to said method, and the gel compositions formed during and used in the method of making the AEI-type zeolites.

According to one aspect of the present disclosure, the method of making an AEI-type zeolite, the method comprising the steps of: a) providing a source of silica; b) providing a source of alumina; c) providing an organic structure directional agent (OSDA); d) providing a source of alkali metal ions; e) providing a zeolite seed; f) mixing the source of silica, alumina, OSDA, and alkali ions in water to form a gel composition; g) heating the gel composition to a crystallization temperature that is in the range of about 135° C. to about 200° C.; h) maintaining the gel composition at the crystallization temperature for a time period that ranges from 10 hours to 168 hours; i) allowing the AEI-type zeolite to crystallize and precipitate; the gel composition forming a crystalline precipitate of the AEI-type zeolite and a mother liquid; and j) separating the crystalline precipitate from the mother liquid.

The AEI-type zeolite so formed exhibits a silica to alumina ($SiO_2:Al_2O_3$) molar ratio of at least 15:1. This method is a hydrothermal synthesis without the use of hydrogen fluoride (HF) that yields the AEI-type zeolite. The FAU zeolite NaY and/or the Y zeolite provide a portion of the source of part or all silica and the source of alumina, in which NaY has a silica to alumina ($SiO_2:Al_2O_3$) molar ratio of ≤5 or, the Y zeolite has a silica to alumina ($SiO_2:Al_2O_3$) molar ratio >5, or a combination thereof.

An AEI zeolite may be added as a seed in an amount of 0.01% to about 10% relative to silica.

According to another aspect of the present disclosure, a gel composition is provided wherein after reacting at a temperature between 135° C. to about 200° C. for 10 hours to 168 hours forms a crystalline AEI-type zeolite having a silica to alumina ratio ($SiO_2:Al_2O_3$) that is greater than 15:1. This gel composition is generally comprised of the components of one or more sources of silica; one or more sources of alumina, one or more organic structure directing agents (OSDA); a source of alkali metal ions; and water. The components in the gel composition may be present in the following molar ratios:

| | |
|---|---|
| $SiO_2/Al_2O_3$ | 18:1 to 100:1; |
| $M_2O/SiO_2$ | 0.15:1 to 0.30:1; |
| $ROH/SiO_2$ | 0.05:1 to 0.13:1; and |
| $H_2O/SiO_2$ | 5:1 to 20:1; | wherein M is the alkali metal ion and R is an organic moiety derived from the OSDA.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
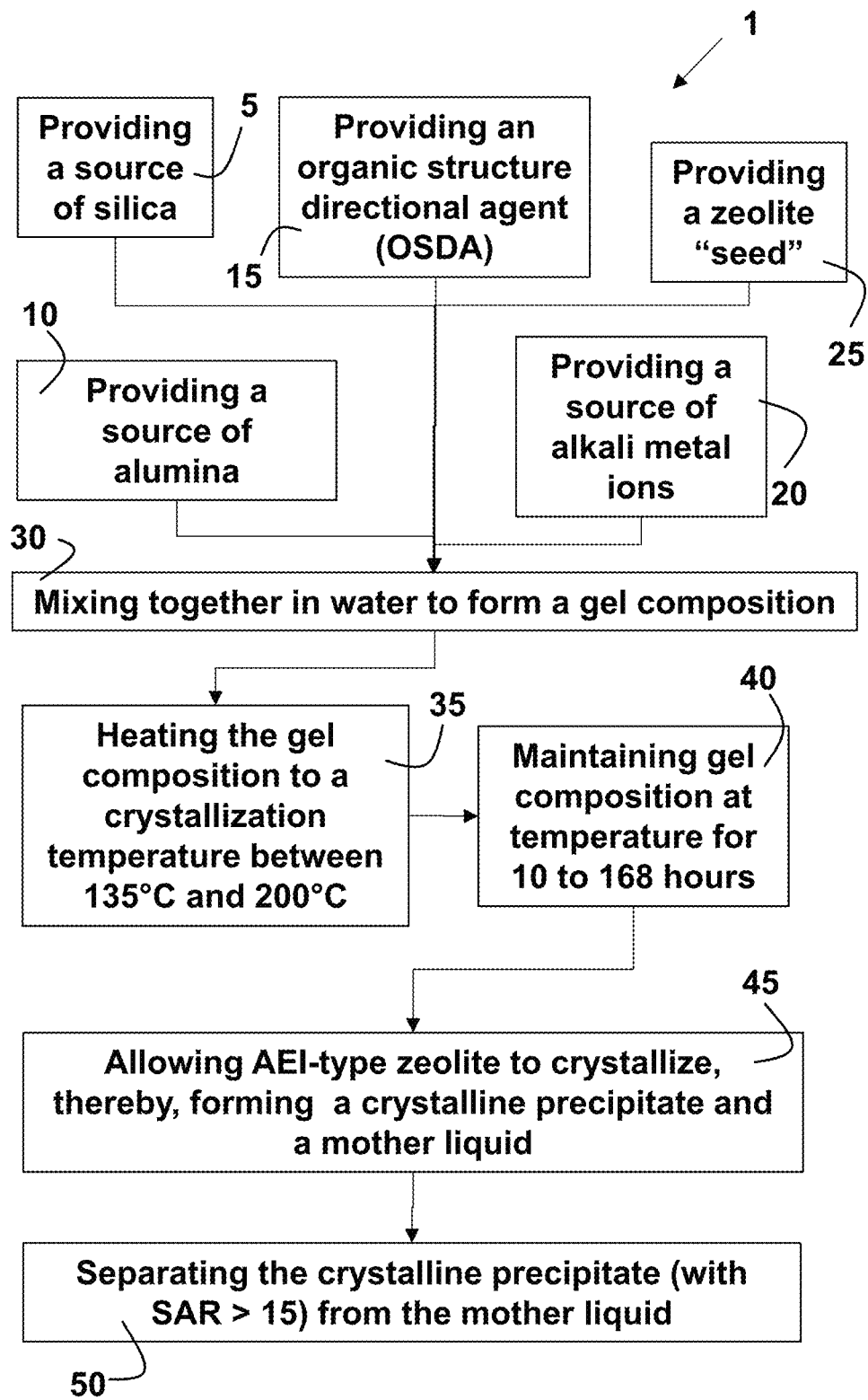
FIG. 1 is a flowchart of a method for preparing an AEI-type zeolite according to the teachings of the present disclosure.

The drawings described herein are for illustration purposes only and are not intended to limit the scope of the present disclosure in any way.

DETAILED DESCRIPTION

The following description is merely exemplary in nature and is in no way intended to limit the present disclosure or its application or uses. For example, the catalyst support made and used according to the teachings contained herein is described throughout the present disclosure in conjunction with a selective catalytic reduction (SCR) catalyst in order to more fully illustrate the composition and the use thereof. The incorporation and use of such an AEI-type zeolite in other applications, such as adsorbents, ion exchange agents, or as a support material used for industrial catalysts and/or environmental catalysts is contemplated to be within the scope of the present disclosure. It should be understood that throughout the description, corresponding reference numerals indicate like or corresponding parts and features.

The present disclosure provides a synthetic method for forming an aluminosilicate AEI-type zeolite having a $SiO_2$:$Al_2O_3$ molar ratio (SAR) of at least 15. This method limits the use of the organic structure directional agent (OSDA) to an OSDA:$SiO_2$ molar ratio that is between about 0.05:1 to about 0.13:1. The low amount of OSDA utilized in this method along with the yield of AEI-type zeolites that are formed according to this method being greater than 25% results in an inexpensive method that does not require additional steps, such as the reuse of the mother liquid in order to reduce cost.

In addition, the resulting AEI-type zeolites are substantially free of fluorine, fluorine-containing compounds and fluorine ions. The synthetic method described herein may be described as a hydrothermal synthesis conducted at an elevated temperature, thereby, making the use of hydrofluoric acid (HF) impractical. The AEI-type zeolite formed according to the method described above and further defined herein is economically feasible for use in most applications. The prior use of conventional synthetic methods of forming the AEI-types zeolites made the use of AEI-type zeolites cost prohibitive for applications, such as a support material for a catalyst in a selective reduction reaction (SCR) of NOx contained in the exhaust gas of a vehicle.

In general, zeolites are crystalline or quasi-crystalline aluminosilicates comprised of repeating $TO_4$ tetrahedral units with T being most commonly silicon (Si) or aluminum (Al). These repeating units are linked together to form a crystalline framework or structure that includes cavities and/or channels of molecular dimensions within the crystalline structure. Thus, aluminosilicate zeolites comprise at least oxygen (O), aluminum (Al), and silicon (Si) as atoms incorporated in the framework structure thereof.

The notation, "AEI" represents a code specified by the International Zeolite Associate (IZA) that defines the framework structure of the zeolite. Thus an "AEI-type" zeolite means an aluminosilicate in which the primary crystalline phase of the zeolite is "AEI". In the AEI-type zeolite of the present disclosure, the presence of another crystalline phase or framework structure, such as "FAU", in the zeolite is absent or nonexistent. In other words, the AEI-type zeolite of the present disclosure is substantially free of other crystalline phases and is not an intergrowth of two or more framework types.

The crystalline phase or framework structure of a zeolite may be characterized by X-ray diffraction (XRD) data. However, the XRD measurement may be influenced by a variety of factors, such as the growth direction of the zeolite; the ratio of constituent elements; the presence of an adsorbed substance, defect, or the like; and deviation in the intensity ratio or positioning of each peak in the XRD spectrum. Therefore, a deviation of 10% or less; alternatively, 5% or less; alternatively, 1% or less in the numerical value measured for each parameter of the AEI structure as described in the definition provided by the IZA is within expected tolerance.

Referring now to FIG. 1, a method 1 is provided for producing an AEI-type zeolite that exhibits a silica to alumina ($SiO_2$:$Al_2O_3$) ratio of at least 15. This method uses an FAU zeolite NaY with a silica to alumina ($SiO_2$:$Al_2O_3$) ratio of less than or equal to 5, a Y zeolite with a $SiO_2$:$Al_2O_3$ molar ratio that is greater than 5 or a combination thereof as source of alumina and source of silica or as a source of alumina and part of the silica source. Alternatively, the $SiO_2$:$Al_2O_3$ molar ratio (SAR) of the formed AEI-type zeolites is at least 20; alternatively, 23 or more; alternatively, about 23; alternatively, between 15 and 23. The $SiO_2$:$Al_2O_3$ ratio exhibited by the AEI-type zeolites may be measured using x-ray fluorescence (XRF) or inductively coupled plasma (ICP) emission spectroscopy.

Still referring to FIG. 1, the method 1 generally comprises the steps of:
a) providing 5 a source of silica;
b) providing 10 a source of alumina;
c) providing 15 an organic structure directional agent (OSDA);
d) providing 20 a source of alkali metal ions;
e) providing 25 a zeolite seed, which provides a portion of the source of silica and the source of alumina;
f) mixing 30 the source of silica, alumina, OSDA, and alkali metal ions in water to form a gel composition;
g) heating 35 the gel mixture to a crystalline temperature that is in the range of about 135° C. to about 200° C.;
h) maintaining 40 the gel mixture at the crystalline temperature for a time period that ranges from 10 hours to 168 hours;
i) allowing 45 the aluminosilicate AEI zeolite to crystallize and precipitate from the gel mixture; forming a crystalline precipitate and a mother liquid; and
j) separating 50 the crystalline precipitate from the mother liquid.

The zeolite seed represents a small amount of AEI zeolite that is incorporated into the gel composition in order to facilitate formation of the AEI-type framework. The amount of the AEI zeolite used as a "seed" may range in an amount from 0.01% to about 10% based on the amount of silica present in the gel composition. Alternatively, the amount of the AEI zeolite used in the seeding is between 0.01% to about 5% based on the amount of silica in the gel composition; alternatively, in the range of 0.01% to 1% based on the silica amount. The AEI zeolite that is used as a "seed" may be in a calcined or uncalcined form as determined to be desirable.

The source of silica may comprise, consist essentially of, or consist of sodium silicate, silica sol, fumed silica, tetraethyl orthosilicate, FAU zeolite NaY with a silica to alumina ($SiO_2:Al_2O_3$) molar ratio of ≤5, a Y zeolite that has a silica to alumina ($SiO_2:Al_2O_3$) molar ratio >5, or a combination thereof. The amount of silica present in the gel composition is determined by the amount necessary for each of the other raw materials to be within the ranges specified herein with respect to the silica in order to provide an AEI-type zeolite that exhibits the desired $SiO_2:Al_2O_3$ ratio.

The source of aluminum may comprise, consist essentially of, or consist of one or more of aluminum metal, aluminum hydroxide (e.g., gibbsite, boehmite, etc.), aluminum sulfate, aluminum nitrate, or a mixture thereof.

The organic structure directional agents (OSDA) that are used in the preparation of AEI-type zeolites are typically complex organic molecules capable of guiding or directing the molecular shape and pattern of the zeolite's framework. Generally, the zeolite crystals form around the OSDA. After the crystals are formed, the OSDA is removed from the interior structure of the crystals, leaving a molecularly porous cage-like structure. The OSDA may include, but not be limited to N, N-Dimethyl-3,5-dimethylpiperidinium hydroxide, N, N-Diethyl-2, 6-dimethylpiperidinium hydroxide, tetramethylphosphonium hydroxide, or a mixture thereof. Alternatively, the OSDA is N, N-Dimethyl-3,5-dimethylpiperidinium hydroxide.

The source of alkali metal ions may comprise, consist essentially of, or consist of alkali metal (M) ions, wherein M is selected as sodium (Na), potassium (K), or cesium (Cs). The alkali metal ions may be obtained from sodium hydroxide, cesium hydroxide, potassium hydroxide, or a combination thereof. Alternatively, the alkali metal ion source is sodium hydroxide. The inclusion of alkali metal ions in the gel composition helps to facilitate crystallization by forcing the OSDA to coordinate with aluminum in a preferred state. When a zeolite is to be used as an adsorbent or as a support for a catalyst, alkali metal atoms that are incorporated into the crystal structure of the zeolite during the formation of the zeolite may be removed from within the crystal structure by an ion exchange mechanism. An ion exchange mechanism is capable of replacing the alkali metal ions with hydrogen, ammonium, or any other desired metal ion.

The yield of AEI-type zeolites formed according to this method is greater than 30% relative to the total oxide present in the gel composition. Alternatively, the yield is greater than 40%; alternatively, greater than 50%. Thus, the method of the present disclosure does not need to reuse the mother liquid as part of the water used to form the gel composition in order to obtain a high yield. However, since the mother liquid contains unreacted OSDA, when desirable, the mother liquid may be used to replace at least a portion of the water in which the raw materials are mixed to form the gel composition. In order to facilitate crystallization and precipitation of the AEI-type zeolite, the amount of water in which the raw materials are mixed 30 (see FIG. 1) is in a molar ratio with silica ($H_2O:SiO_2$) that is typically at least 5:1 and no greater than 20:1 as further defined below.

According to one aspect of the present disclosure, the gel composition may be further described by molar ratios for each raw material with respect to the amount of silica ($SiO_2$). These molar ratios include those shown in Table 1, wherein M refers to the alkali metal ions and R refers to an organic moiety derived from the OSDA.

TABLE 1

Raw Material Ratios in Gel Composition

| | |
|---|---|
| $SiO_2:Al_2O_3$ | 18:1 to 100:1 |
| $M_2O:SiO_2$ | 0.15:1 to 0.30:1 |
| $ROH:SiO_2$ | 0.05:1 to 0.13:1 |
| $H_2O:SiO_2$ | 5:1 to 20:1 |

Alternatively, the gel composition may be described by molar ratios of the raw materials with respect to the amount of silica ($SiO_2$) may include those provided in Table 2, wherein M refers to the alkali metal and R refers to an organic moiety derived from the OSDA.

TABLE 2

Raw Material Ratios in Another Gel Composition

| | |
|---|---|
| $SiO_2:Al_2O_3$ | about 20:1 to about 60:1 |
| $M_2O:SiO_2$ | about 0.20:1 to about 0.26:1 |
| $ROH:SiO_2$ | about 0.06:1 to about 0.12:1 |
| $H_2O:SiO_2$ | about 7:1 to about 15:1 |

The gel composition formed in step f) of the method 1 in FIG. 1 may be subjected to hydrothermal conditions just after the preparation, or when desirable after undergoing a period of mixing, e.g., aging at a low temperature including, without limitation about room temperature or less than 100° C. over a period of about 1 to about 24 hours. During production on a large scale, a deterioration in the mixing the raw materials may be undesirable, in that a sufficient state of admixture is necessary to achieve high yield and proper crystallization of the AEI-type zeolites.

Still referring to FIG. 1, during implementation of the method 1, the gel composition is subjected to heating 35 at predetermined crystallization temperature for a predetermined amount of time. This hydrothermal synthesis utilizes a crystallization temperature that is in the range from about 135° C. up to 200° C.; alternatively, between about 140° C. and about 190° C.; alternatively, from about 145° C. to about 180° C.; alternatively, between 145° C. and 165° C. The time period over which the temperature is maintained 35 in order to result in the crystallization and precipitation of the AEI zeolite is between 15 hours and 168 hours; alternatively between about 24 hours and about 96 hours; alternatively between about 24 hours and about 48 hours.

Upon completion of the hydrothermal reaction, the AEI-type zeolite in the form of a crystalline precipitate is separated from remaining liquid (e.g., the mother liquid). The mother liquid may be discarded, or when desirable, reused as a replacement for at least a portion of the water that is used in the making of another batch of the AEI-type zeolite. This separation may use any known conventional method, including but not limited to, filtration, decantation, or direct drying (e.g., evaporation).

After separation from the mother liquid, the AEI-type zeolite, which may include some OSDA and/or alkali ions, may be collected, optionally washed with water, and then dried. The dried support material may be used in the dried state for some applications or subjected to calcination prior to use for other applications. Calcination of the AEI-zeolites at a high temperature (e.g., >200 C; >300 C, etc.) removes any residual OSDA present in the porous structure.

According to another aspect of the present disclosure, the dried AEI-type zeolites formed according to the process described above and further defined herein exhibits an average particle size that is less than 5 micrometers (μm); alternatively, less than about 2 micrometers; alternatively, less than about 1 μm. The average particle size of the AEI-type zeolites may be measured using any known conventional method including, without limitation, laser diffraction, dynamic light scattering, and sieving.

The "dried" AEI-type zeolites formed herein may also exhibit a BET specific surface area that is greater than 500 m$^2$/g; alternatively, at least 600 m$^2$/g; alternatively, equal to or greater than 700 m$^2$/g. The specific surface area of the AEI-type zeolites may be measured using a conventional Brunauer-Emmett-Teller (BET) method.

The morphology exhibited by the "dried" AEI-type zeolites may resemble cubes, square flakes, irregular particles, or a combination or mixture thereof. Alternatively, the morphology of the AEI-type zeolites resembles cubes, square flakes, or a mixture thereof.

According to another aspect of the present disclosure, a gel composition is provided that comprises a source of silica, a source of alumina, an organic structure directional agent (OSDA); a source of alkali metal ions, water, and a small amount of an AEI-zeolite as a "seed". The amount of each raw material present in the gel composition is provided relative to the amount of silica by the ratios shown in either Table 1 or Table 2. This gel composition after reacting at a temperature between 135° C. to about 180° C. for 15 hours to 168 hours forms a crystalline AEI-type zeolite having a silica to alumina ($SiO_2$:$Al_2O_3$) ratio that is greater than 15:1.

The use of the AEI-type zeolite formed according to the method of the present disclosure may include, without limitation, as a support material for a catalyst, an absorbent, or a separation material. The "dried" AEI-type zeolites may be used prior to or after calcination.

A catalyst may comprise the AEI-type zeolite with one or more catalytic metal ions exchanged for an atom in the framework or otherwise impregnated into the pores and/or cavities of the zeolite. Several examples of catalytic metal ions that may be incorporated into the AEI-type zeolite include, without limitation, ions of transition metals, platinum group metals (PGM), precious metals, such as gold or silver; alkaline earth metals, rare earth metals, or mixtures thereof. Transition metals may comprise, consist essentially of, or consist of copper, nickel, zinc, iron, tungsten, molybdenum, cobalt, titanium, zirconium, chromium, or tin. Platinum group metals may include, without limitation, ruthenium, rhodium, palladium, indium, and platinum. Alkaline earth metals include beryllium, magnesium, calcium, strontium, and barium. Rare earth metals include lanthanum, cerium, praseodymium, neodymium, europium, terbium, erbium, ytterbium, and yttrium.

The following specific examples are given to illustrate the disclosure and should not be construed to limit the scope of the disclosure. Those skilled-in-the-art, in light of the present disclosure, will appreciate that many changes can be made in the specific embodiments which are disclosed herein and still obtain alike or similar result without departing from or exceeding the spirit or scope of the disclosure.

In the following examples, a HORIBA LA-920 laser particle sizer is used for the measurement of particle size distribution, a Rigaku MiniFlex II DESKTOP X-ray diffractometer is used for the measurement of phase and crystallinity, a Micromeritics TriStar II 3020 is used for the measurement of BET surface areas, a Spectro Analytical Instruments Model FCPSA83D ICP is used for analysis of chemical compositions, and zeolite morphology is measured using scanning electron microscopy (SEM).

Example 1—Preparation & Characterization of a Batch of AEI-Type Zeolites

The source of alumina used in this example were high SAR Y zeolites having a silica to alumina ratio (SAR) of 37.74 and 9.55. The ratio of OSDA:$SiO_2$ utilized in this example was on the order of 0.06:1.

A total of 212.84 grams of tetramethylphosphonium hydroxide (TMPOH 35%, Sachem Americas, Austin, TX) as an organic structural directional agent (OSDA) was placed into a 2-liter beaker. Then 38.55 grams of NaOH (99%) was dissolved in enough distilled water to make a 50% solution. The NaOH solution was then added slowly to the OSDA under agitation. A total of 144.33 grams of a Y zeolite (SARH-2H, PIDC, Ann Arbor, MI) having a silica to alumina ratio (SAR) of 37.74 and a loss on ignition (LOI) of 13.17% and 67.64 grams of a Y zeolite (SARH-1H, PIDC, Ann Arbor, MI) having an SAR of 9.55 and an LOI of 10.92% were then added under agitation. The mixture was stirred for 10 minutes. Then, 1034.83 grams of sodium silicate ($Na_2O$: 8.81%, $SiO_2$:28.80%, PQ Corp., Malvern, PA) was added to the above mixture. The resulting slurry was mixed for 10 minutes to form a homogeneous gel. The gel was then transferred into a 2-liter autoclave reaction vessel. A total of 2 grams of a proton-type AEI zeolite was added to the gel as seeds. The gel was allowed to hydrothermally react and crystallize at 165° C. for 20 hours. The reaction product was placed into a funnel filter and washed with five (5) liters of deionized water. The wetcake was allowed to dry in an oven at 120° C. overnight. The resulting dried material was broken apart and sieved through a 300 μm screen to obtain about 140 grams of AEI-type zeolites in powder form.

Figure 2:
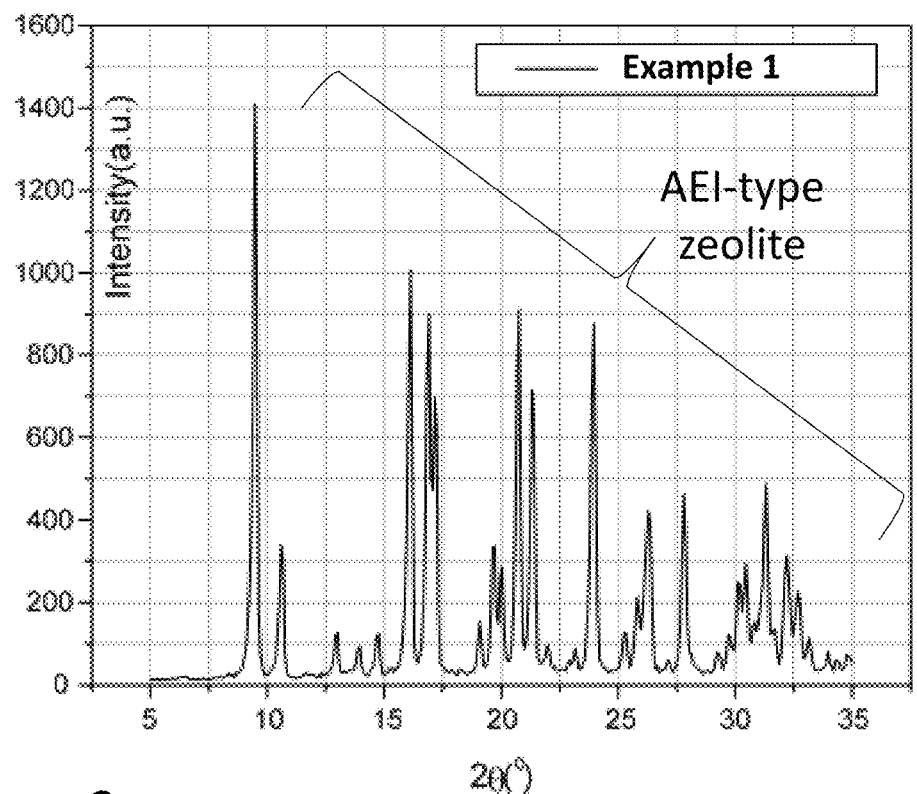
FIG. 2 is an x-ray diffraction (XRD) spectrum of the AEI-type zeolite made in Example 1 according to the method of FIG. 1.

Referring now to FIG. 2, the measured x-ray diffraction (XRD) pattern for the zeolite collected and dried in this example shows an AEI-type structure or framework is present. The measured XRD pattern further demonstrates that this AEI-type zeolite is substantially free of any other type of crystalline zeolite phase or structure such as the competing phase peaks of Analcime at 2Θ~15.78°, 18.24°, 25.98° and Mordenite at 2Θ~6.5°.

Figure 3:
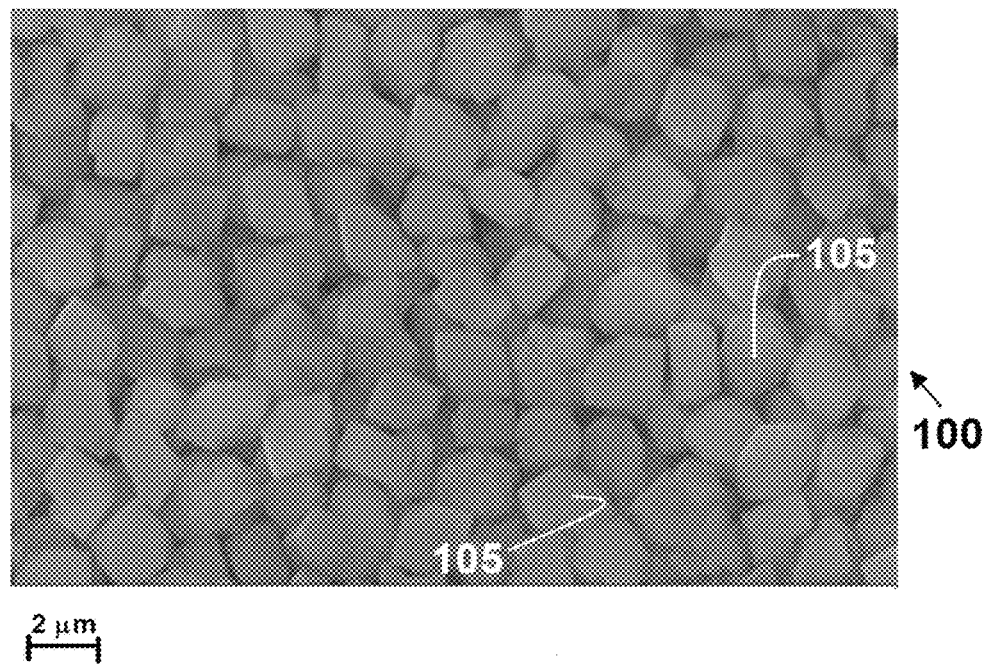
FIG. 3 is a scanning electron micrograph (SEM) of the AEI-type zeolite described in FIG. 2.

Referring now to FIG. 3, the morphology of the AEI-type zeolite 100 collected and dried in this Example 1 is shown is the scanning electron micrograph to include predominantly cubes 105 exhibiting an average size of about 2 micrometers.

The collected powder was calcined in a muffle furnace at 550° C. for 8 hours to remove any residual OSDA from the zeolite cage, The calcined powder was then subjected twice to an ion exchange process using ammonium chloride at room temperature for 1 hour. After the solid and liquid were separated the solid was washed in water then oven dried overnight to obtain an ammonia-form of AEI zeolites. A proton-form AEI zeolite may be obtained by performing calcination of the ammonia-form of the AEI zeolites at 450° C. for 16 hours.

Silica to alumina ratio (SAR) of the AEI-type zeolite formed in this example was measured using Inductively Coupled Plasma ICP. The SAR exhibited by the AEI-type zeolite was 16.58 with residual $Na_2O$ present in an amount of 20 ppm.

The specific surface area (SA), pore volume (PV), and pore diameter (PD) was measured using a conventional Brunauer-Emmett-Teller (BET) method. The specific surface area of a fresh sample of the AEI-type zeolite was 697.26 m$^2$/g, while the pore volume (PV) was 0.316 cm$^3$/g and pore diameter (PD) was 1.8 nanometers (nm). After hydrothermal aging the AEI-type zeolites at 900° C. for 3 hours (in 10% steam balanced by air) the aged AEI-type zeolites exhibited a SA=701.75 m$^2$/g, PV=0.311 cm$^3$/g and PD=1.8 nm.

Example 2—Preparation & Characterization of Another Batch of AEI-Type Zeolites

The sources of alumina used in this example were high SAR Y zeolites exhibiting an SAR of 35.11 and 9.19. The ratio of OSDA:SiO2 utilized in this example was on the order of 0.09:1.

A total of 342.14 grams of tetramethylphosphonium hydroxide (TMPOH 35%, Sachem Americas, Austin, TX) as an organic structural directional agent (OSDA) was placed into a 2-liter beaker. Then 21.66 grams of NaOH (99%) was dissolved in enough distilled water to make a 50% solution. The NaOH solution was then added slowly to the OSDA under agitation. A total of 173.81 grams of a Y zeolite (SARH-2H, PIDC, Ann Arbor, MI) having a silica to alumina ratio (SAR) of 35.11 and a loss on ignition (LOI) of 10.86% and 74.18 grams of a Y zeolite (SARH-1H, PIDC, Ann Arbor, MI) having an SAR of 9.19 and an LOI of 14.46% were then added under agitation. The mixture was stirred for 10 minutes. Then, 1034.83 grams of sodium silicate (Na$_2$O: 8.84%, SiO$_2$:28.86%, PQ Corp., Malvern, PA) was added to the above mixture. The resulting slurry was mixed for 10 minutes to form a homogeneous gel. The gel was then transferred into a 2-liter autoclave reaction vessel. A total of 2 grams of a proton-type AEI zeolite was added to the gel as seeds. The gel was allowed to hydrothermally react and crystallize at 165° C. for 96 hours. The reaction product was placed into a funnel filter and washed with five (5) liters of deionized water. The wetcake was allowed to dry in an oven at 120° C. overnight. The resulting dried material was broken apart and sieved through a 300 µm screen to obtain about 180 grams of AEI-type zeolites in powder form.

Figure 4:
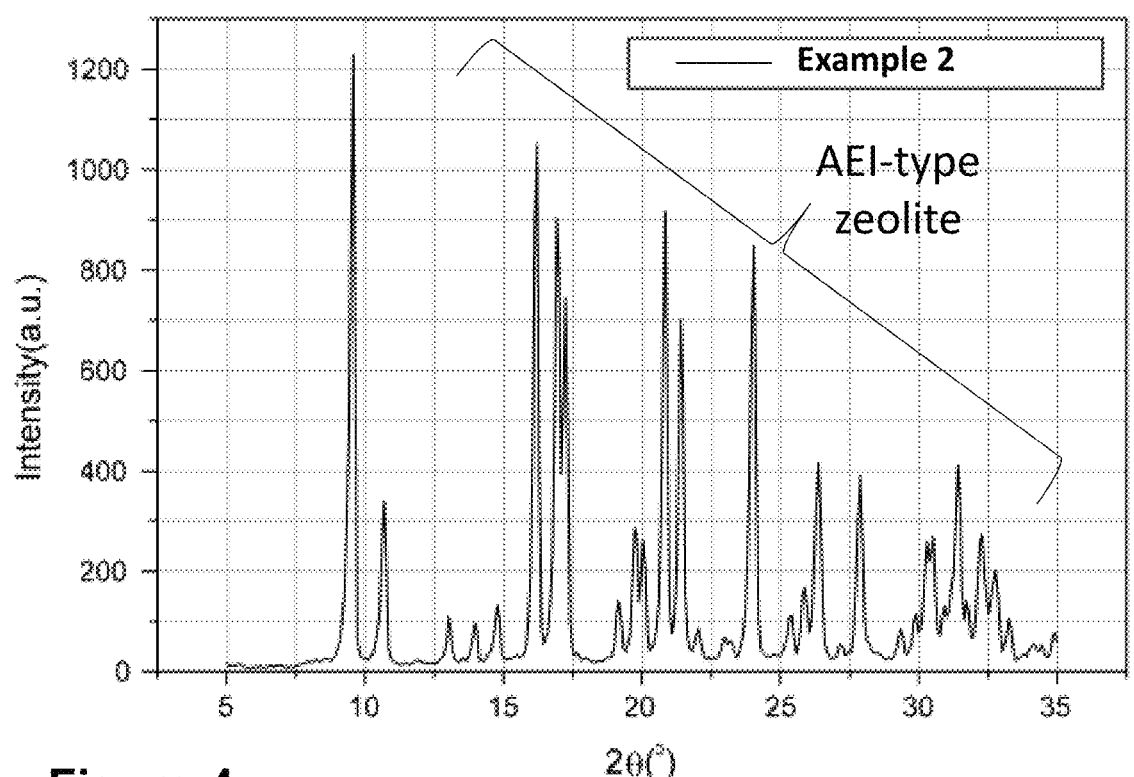
FIG. 4 is an x-ray diffraction (XRD) spectrum of another AEI-type zeolite made in Example 2 according to the method of FIG. 1.

Referring now to FIG. 4, the measured x-ray diffraction (XRD) pattern for the zeolite collected and dried in this example shows an AEI-type structure or framework is present. The measured XRD pattern further demonstrates that this AEI-type zeolite is substantially free of any other type of crystalline zeolite phase or structure such as the competing phase peaks of Analcime at 2e~15.78°, 18.24°, 25.98° and Mordenite at 2e~6.5°.

Figure 5:
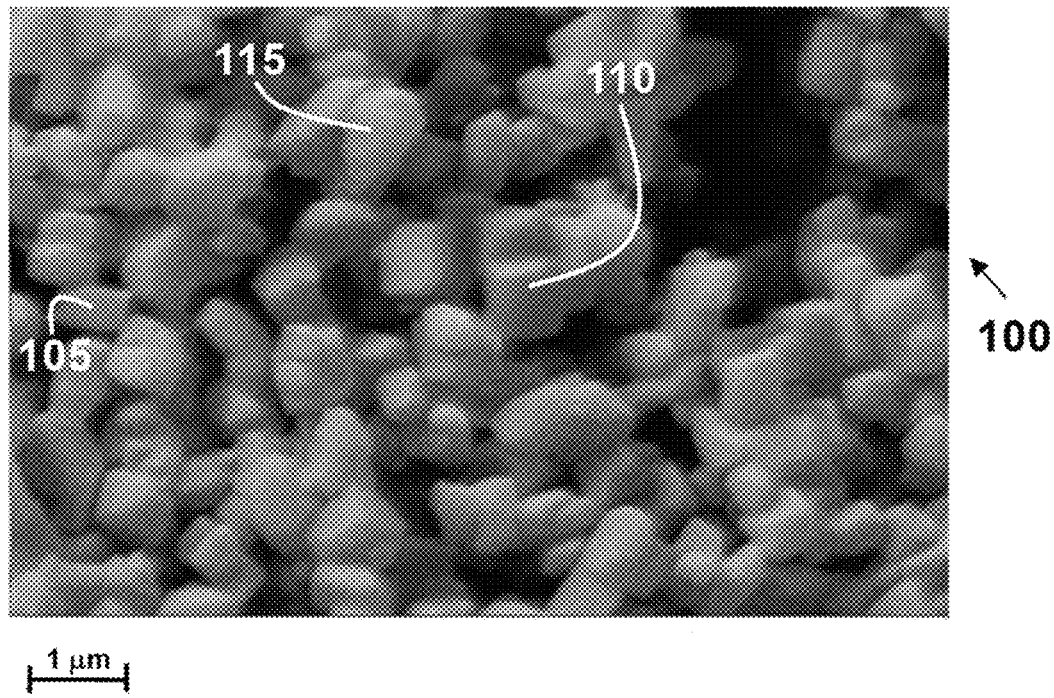
FIG. 5 is a scanning electron micrograph (SEM) of the AEI-type zeolite described in FIG. 4.

Referring now to FIG. 5, the morphology of the AEI-type zeolite 100 collected and dried in this Example 2 is shown is the scanning electron micrograph to include a combination of cubes 105, square flakes 110, and irregular particles 115. The average particle size was measured to be less than about 1 micrometer. The silica to alumina ratio (SAR) of the AEI-type zeolite formed in this example was measured using Inductively Coupled Plasma ICP. The SAR exhibited by the AEI-type zeolite was 20.98 with residual Na$_2$O present in an amount of 36 ppm.

The specific surface area (SA), pore volume (PV), and pore diameter (PD) was measured using a conventional Brunauer-Emmett-Teller (BET) method. The specific surface area of a fresh sample of the AEI-type zeolite was 771.22 m$^2$/g, while the pore volume (PV) was 0.293 cm$^3$/g and pore diameter (PD) was 1.5 nanometers (nm). After hydrothermal aging the AEI-type zeolites at 900° C. for 3 hours (in 10% steam balanced by air) the aged AEI-type zeolites exhibited a SA=729.27 m$^2$/g, PV=0.286 cm$^3$/g and PD=1.5 nm.

Example 3—Preparation & Characterization of Another Batch of AEI-Type Zeolites

The source of alumina used in this example are high SAR Y zeolites with SAR 35.11 and 9.19. The ratio of OSDA: SiO2 utilized in this example was on the order of 0.09:1.

A total of 448.12 grams of tetramethylphosphonium hydroxide (TMPOH 35%, Sachem Americas, Austin, TX) as an organic structural directional agent (OSDA) was placed into a 2-liter beaker. Then 11.34 grams of NaOH (99%) was dissolved in enough distilled water to make a 50% solution. The NaOH solution was then added slowly to the OSDA under agitation. A total of 170.73 grams of a Y zeolite (SARH-2H, PIDC, Ann Arbor, MI) having a silica to alumina ratio (SAR) of 35.11 and a loss on ignition (LOI) of 10.86% and 72.87 grams of a Y zeolite (SARH-1H, PIDC, Ann Arbor, MI) having an SAR of 9.19 and an LOI of 14.46% were then added under agitation. The mixture was stirred for 10 minutes. Then, 1023.01 grams of sodium silicate (Na$_2$O: 8.84%, SiO$_2$:28.86%, PQ Corp., Malvern, PA) was added to the above mixture. The resulting slurry was mixed for 10 minutes to form a homogeneous gel. The gel was then transferred into a 2-liter autoclave reaction vessel. A total of 2 grams of a proton-type AEI zeolite was added to the gel as seeds. The gel was allowed to hydrothermally react and crystallize at 165° C. for 24 hours. The reaction product was placed into a funnel filter and washed with five (5) liters of deionized water. The wetcake was allowed to dry in an oven at 120° C. overnight. The resulting dried material was broken apart and sieved through a 300 µm screen to obtain about 180 grams of AEI-type zeolites in powder form.

Figure 6:
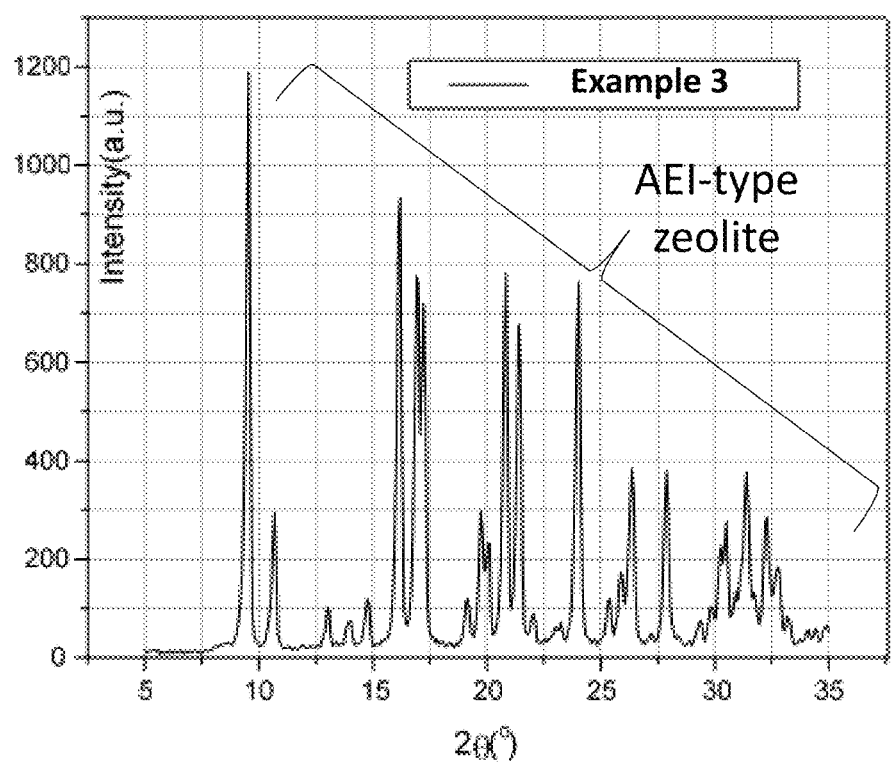
FIG. 6 is an x-ray diffraction (XRD) spectrum of yet another AEI-type zeolite made in Example 3 according to the method of FIG. 1.

Referring now to FIG. 6, the measured x-ray diffraction (XRD) pattern for the zeolite collected and dried in this example shows an AEI-type structure or framework is present. The measured XRD pattern further demonstrates that this AEI-type zeolite is substantially free of any other type of crystalline zeolite phase or structure, such as the competing phase peaks of Analcime at 2⊖~15.78°, 18.24°, 25.98° and Mordenite at 2⊖6.5°.

Figure 7:
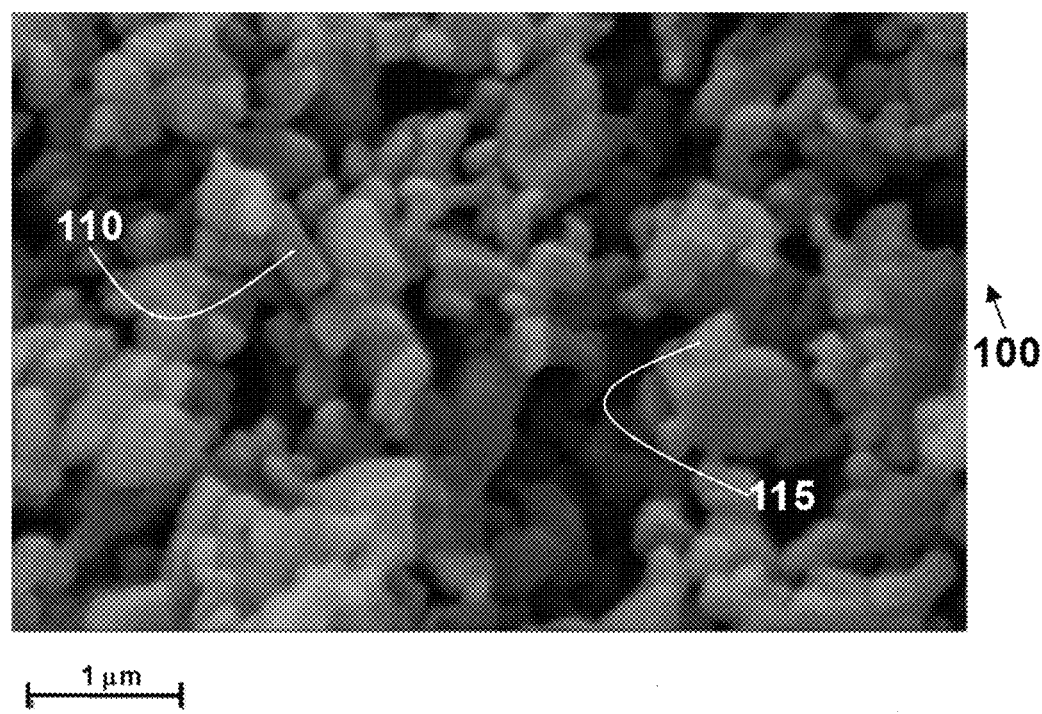
FIG. 7 is a scanning electron micrograph (SEM) of the AEI-type zeolite described in FIG. 6.

Referring now to FIG. 7, the morphology of the AEI-type zeolite 100 collected and dried in this Example 3 is shown is the scanning electron micrograph to include a combination of square flakes 110 and irregular particles 115. The average particle size was measured to be less than 1 micrometer.

The silica to alumina ratio (SAR) of the AEI-type zeolite formed in this example was measured using Inductively Coupled Plasma ICP. The SAR exhibited by the AEI-type zeolite was 22.01 with residual Na$_2$O present in an amount of 50 ppm.

The specific surface area (SA), pore volume (PV), and pore diameter (PD) was measured using a conventional Brunauer-Emmett-Teller (BET) method. The specific surface area of a fresh sample of the AEI-type zeolite was 752.01 m$^2$/g, while the pore volume (PV) was 0.311 cm$^3$/g and pore diameter (PD) was 1.7 nanometers (nm). After hydrothermal aging the AEI-type zeolites at 900° C. for 3 hours (in 10% steam balanced by air) the aged AEI-type zeolites exhibited a SA=771.83 m$^2$/g, PV=0.319 cm$^3$/g and PD=1.7 nm.

Example 4—Preparation & Characterization of Another Batch of AEI-Type Zeolites

The source of alumina used in this example were FAU NaY zeolite with an SAR of 5.0. The ratio of OSDA:SiO2 utilized in this example was on the order of 0.09:1.

A total of 317.03 grams of tetramethylphosphonium hydroxide (TMPOH 35%, Sachem Americas, Austin, TX) as an organic structural directional agent (OSDA) was placed into a 2-liter beaker. Then 121.81 grams of NaOH (99%) was dissolved in enough distilled water to make a 50% solution. The NaOH solution was then added slowly to the OSDA under agitation. A total of 1046.3 grams of a silica sol (40% SiO2, W.R. Grace, Columbia, MD) was then added dropwise. The mixture was stirred for 10 minutes. Then, 82.95 grams of NaY having an SAR of 5, $Na_2O$ amount of 8.82%, and a loss on ignition (LOI) of 24.88% was added under agitation. The resulting slurry was mixed for 10 minutes to form a homogeneous gel. The gel was then transferred into a 2-liter autoclave reaction vessel. A total of 2 grams of a proton-type AEI zeolite was added to the gel as seeds. The gel was allowed to hydrothermally react and crystallize at 165° C. for 36 hours. The reaction product was placed into a funnel filter and washed with five (5) liters of deionized water. The wetcake was allowed to dry in an oven at 120° C. overnight. The resulting dried material was broken apart and sieved through a 300 μm screen to obtain about 180 grams of AEI-type zeolites in powder form.

Figure 8:
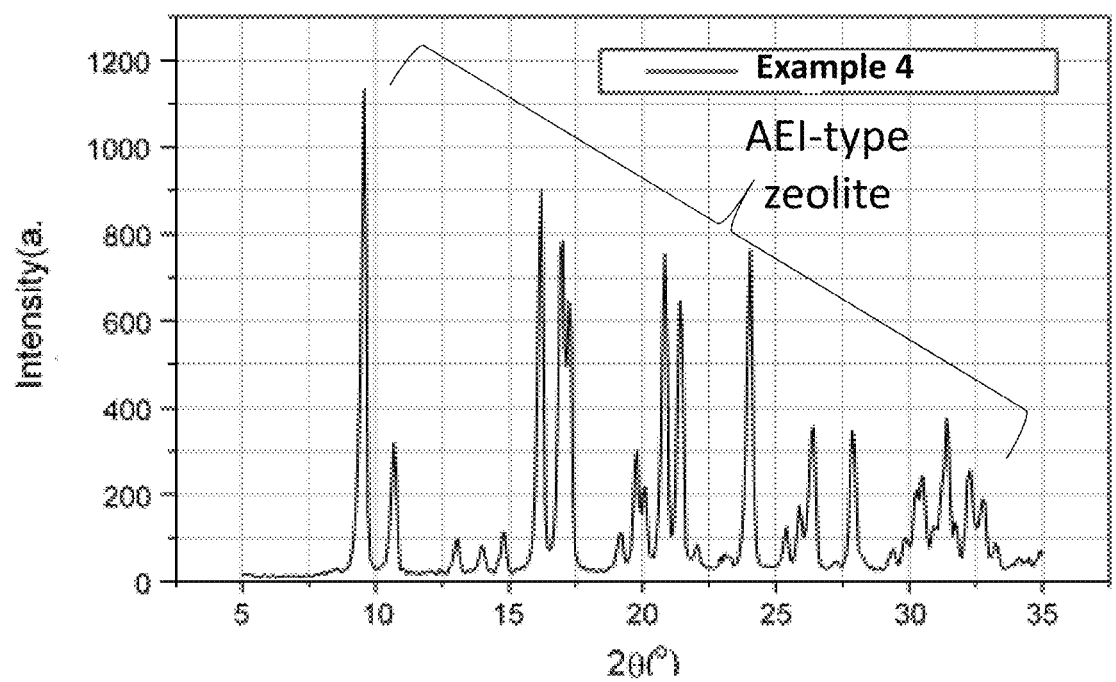
FIG. 8 is an x-ray diffraction (XRD) spectrum of still another AEI-type zeolite made in Example 4 according to the method of FIG. 1.

Referring now to FIG. 8, the measured x-ray diffraction (XRD) pattern for the zeolite collected and dried in this example shows an AEI-type structure or framework is present. The measured XRD pattern further demonstrates that this AEI-type zeolite is substantially free of any other type of crystalline zeolite phase or structure, such as the competing phase peaks of Analcime at 2⊖~15.78°, 18.24°, 25.98° and Mordenite at 2⊖~6.5°.

Figure 9:
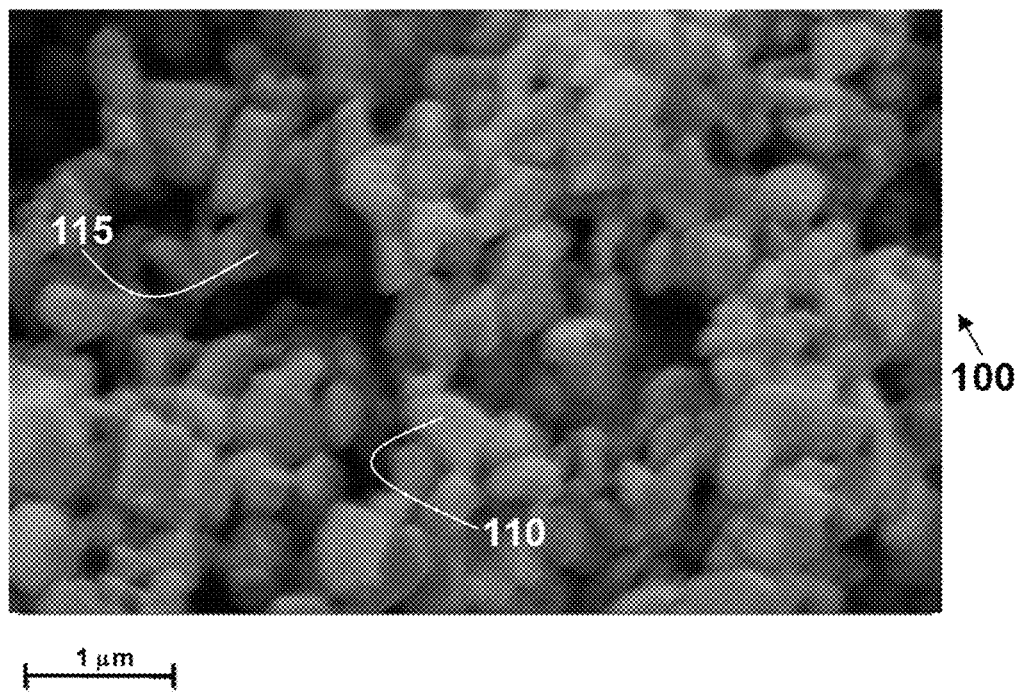
FIG. 9 is a scanning electron micrograph (SEM) of the AEI-type zeolite described in FIG. 8.

Referring now to FIG. 9, the morphology of the AEI-type zeolite 100 collected and dried in this Example 4 is shown in the scanning electron micrograph to include a combination of square flakes 110 and irregular particles 115.

The silica to alumina ratio (SAR) of the AEI-type zeolite formed in this example was measured using Inductively Coupled Plasma ICP. The SAR exhibited by the AEI-type zeolite was 20.58 with residual $Na_2O$ present in an amount of 30 ppm.

The specific surface area (SA), pore volume (PV), and pore diameter (PD) was measured using a conventional Brunauer-Emmett-Teller (BET) method. The specific surface area of a fresh sample of the AEI-type zeolite was 757.69 $m^2/g$, while the pore volume (PV) was 0.347 $cm^3/g$ and pore diameter (PD) was 1.8 nanometers (nm). After hydrothermal aging the AEI-type zeolites at 900° C. for 3 hours (in 10% steam balanced by air) the aged AEI-type zeolites exhibited a SA=773.98 $m^2/g$, PV=0.332 $cm^3/g$ and PD=1.7 nm.

Example 5—Selective Catalytic Reduction (SCR) Performance

Figure 10:
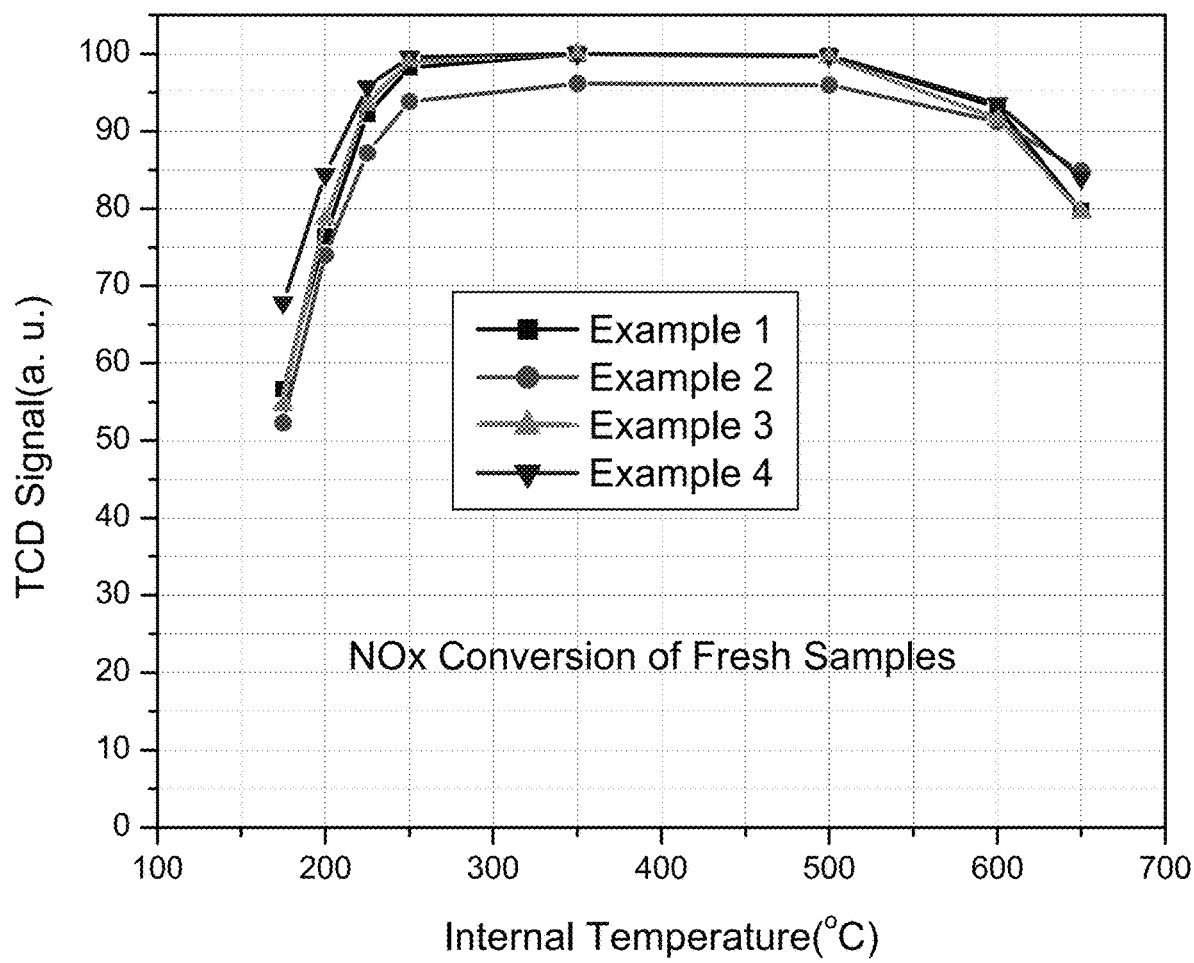
FIG. 10 is a graphical representation of the $NO_x$ conversion for freshly prepared AEI-type zeolites formed according to the teachings of the present disclosure.
Figure 11:
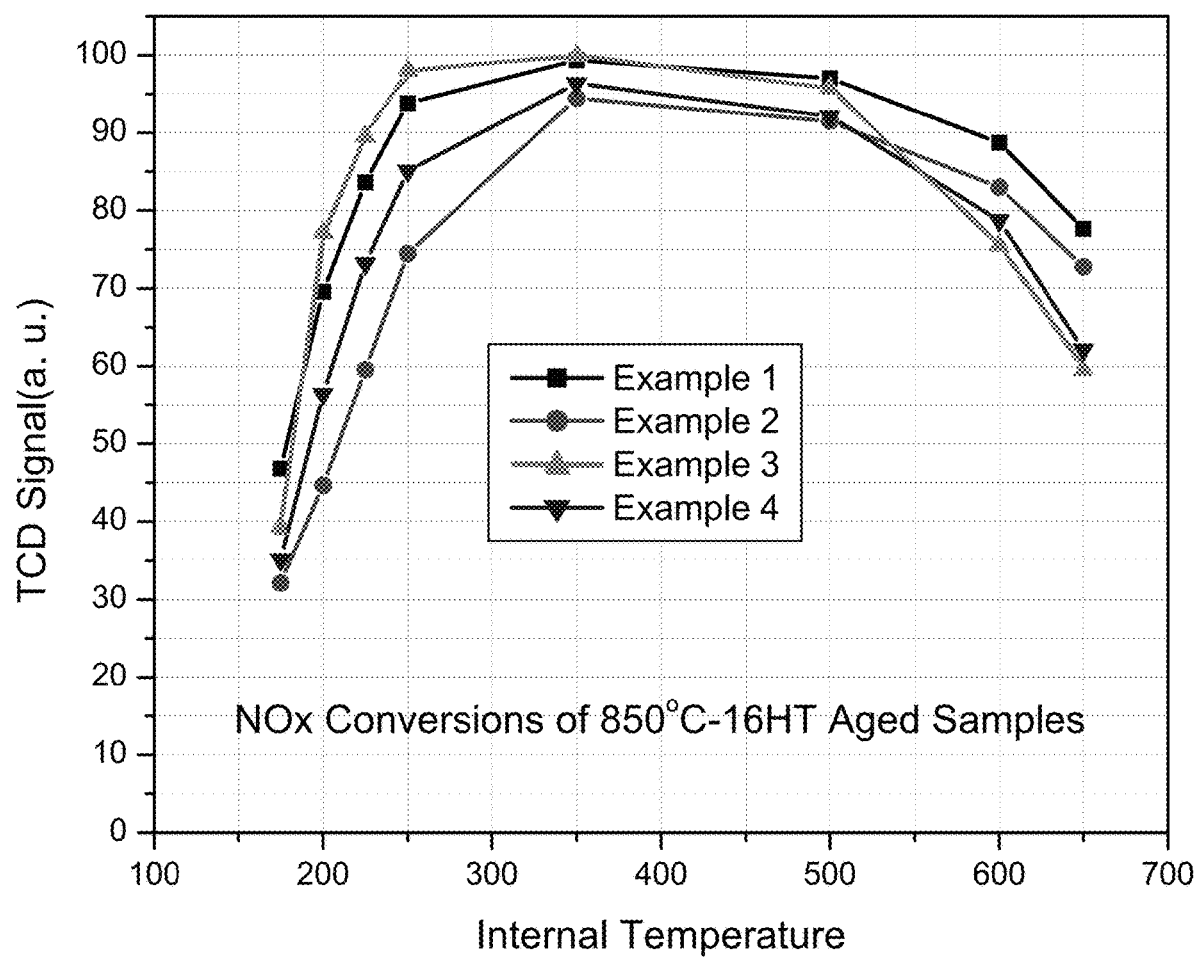
FIG. 11 is a graphical representation of the $NO_x$ conversion for hydrothermally aged AEI-type zeolites formed according to the teachings of the present disclosure.

A flow-reactor was used for testing NOx conversion of a catalyst formed using the AEI-type zeolites formed in Examples 1-4. Copper (Cu) ions were ion exchanged for the alkali metal ions present in the zeolite structure by adding the AEI-type zeolite powder into a copper acetate solution and allowing the mixture to age for 2 hours at 80° C. The CuO content incorporated into the zeolites of Examples 1-4 were measured to be 4.22% (Example 1); 3.84% (Example 2); 3.90% (Example 3); and 3.94% (Example 4). As shown in FIG. 10, fresh samples of the Cu-AEI zeolites prepared in Examples 1-4 exhibit >90% conversion of $NO_x$ over a wide temperature window ranging from 250° C. to 600° C. After hydrothermal aging of the Cu-AEI zeolites (Examples 1-4) at 850° C. for 16 hours, the Cu-AEI zeolites still exhibit about 85% or higher $NO_x$ conversion from 300° C. to 550° C. as shown in FIG. 11.

For the purpose of this disclosure, the terms "about" and "substantially" are used herein with respect to measurable values and ranges due to expected variations known to those skilled in the art (e.g., limitations and variability in measurements).

For the purpose of this disclosure any range in parameters that is stated herein as being "between [a $1_{st}$ number] and [a $2^{nd}$ number]" or "between [a $1^{st}$ number] to [a $2^{nd}$ number]" is intended to be inclusive of the recited numbers. In other words the ranges are meant to be interpreted similarly as to a range that is specified as being "from [a $1^{st}$ number] to [a $2^{nd}$ number]".

For the purpose of this disclosure, the term "weight" refers to a mass value, such as having the units of grams, kilograms, and the like. Further, the recitations of numerical ranges by endpoints include the endpoints and all numbers within that numerical range. For example, a concentration ranging from 40% by weight to 60% by weight includes concentrations of 40% by weight, 60% by weight, and all concentrations there between (e.g., 40.1%, 41%, 45%, 50%, 52.5%, 55%, 59%, etc.).

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one metal", "one or more metals", and "metal(s)" may be used interchangeably and are intended to have the same meaning.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Those skilled-in-the-art, in light of the present disclosure, will appreciate that many changes can be made in the specific embodiments which are disclosed herein and still obtain alike or similar result without departing from or exceeding the spirit or scope of the disclosure. One skilled in the art will further understand that any properties reported herein represent properties that are routinely measured and can be obtained by multiple different methods. The methods described herein represent one such method and other methods may be utilized without exceeding the scope of the present disclosure.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of making an AEI-type zeolite, the method comprising the steps of:
   a) providing a source of silica;
   b) providing a source of alumina;
   c) providing an organic structure directional agent (OSDA); the ratio of the OSDA to silica being in the range of 0.05 to 0.13:
   d) providing a source of alkali metal ions;
   e) providing a zeolite seed;
   f) mixing the source of silica and alumina with the OSDA, the alkaline metal ions, and the zeolite seed in water to form a gel composition;
   g) heating the gel composition to a crystallization temperature that is in the range of about 135° C. to about 200° C.;
   h) maintaining the gel composition at the crystallization temperature for a time period that ranges from 10 hours to 168 hours;
   i) allowing the AEI-type zeolite to crystallize and precipitate; the gel composition forming a crystalline precipitate of the AEI-type zeolite and a mother liquid; and
   j) separating the crystalline precipitate from the mother liquid;
   wherein the AEI-type zeolite has a silica to alumina ($SiO_2$:$Al_2O_3$) molar ratio of at least 15:1;
   wherein the source of alumina is in the form of a FAU zeolite NaY that has a silica to alumina ($SiO_2$:$Al_2O_3$) molar ratio of ≤5, a Y zeolite that has a silica to alumina ($SiO_2$:$Al_2O_3$) molar ratio >5, or a combination thereof;
   wherein a portion of the source of silica is derived from the source of alumina, while the remainder of the source of silica includes one selected from sodium silicate, silica sol, fumed silica, tetraethyl orthosilicate, or a mixture thereof.

2. The method of claim 1, wherein the zeolite seed is present in an amount of 0.01% to about 10% relative to the amount of silica present in the AEI-type zeolite.

3. The method of claim 2, wherein the zeolite seed is present in an amount of 0.01% to about 1% relative to the amount of silica present in the AEI-type zeolite.

4. The method of claim 1, wherein the yield of the AEI-type zeolite relative to the total oxide present in the gel composition is greater than 30%.

5. The method of claim 1, wherein the yield of the AEI-type zeolite relative to the total oxide present in the gel composition is greater than 50%.

6. The method of claim 1, wherein the source of silica includes one selected from sodium silicate, silica sol, or a mixture thereof.

7. The method of claim 1, wherein the source of alumina includes one selected from aluminum metal, aluminum hydroxide, aluminum sulfate, aluminum nitrate, or a mixture thereof.

8. The method of claim 1, wherein the organic structure directional agent (OSDA) is one selected from N, N-Dimethyl-3,5-dimethylpiperidinium hydroxide, N, N-Diethyl-2,6-dimethylpiperidinium hydroxide, tetramethylphos-phonium hydroxide, or a mixture thereof.

9. The method of claim 1, wherein the alkali metal ions include one or more alkali metals (M); wherein M is selected sodium (Na), potassium (K), cesium (Cs), or a mixture thereof.

10. The method of claim 1, wherein the gel composition is further defined by a molar ratio for $SiO_2/Al_2O_3$ of 18:1 to 100:1; a molar ratio for $M_2O/SiO_2$ of 0.15:1 to 0.30:1; a molar ratio for $ROH/SiO_2$ of 0.05:1 to 0.13:1; and a molar ratio for $H_2O/SiO_2$ of 5:1 to 20:1;
   wherein M is the alkali metal ion and R is an organic moiety derived from the OSDA.

11. The method of claim 10, wherein the molar ratio in the gel composition for $SiO_2/Al_2O_3$ is 20:1 to 60:1; for $M_2O/SiO_2$ is 0.20:1 to 0.26:1; for $ROH/SiO_2$ is 0.06:1 to 0.12:1; and for $H_2O/SiO_2$ is 7:1 to 15:1.

12. The method of claim 1, wherein the gel composition is heated to a crystallization temperature that is in the range of about 145° C. to about 165° C.

13. The method of claim 1, wherein the gel composition is held at the crystallization temperature for a time period that ranges from about 24 hours to about 96 hours.

14. The method of claim 1, wherein the molar ratio of silica to alumina (SiO2: $Al_2O_3$) in the AEI-type zeolite is greater than or equal to 18.

15. The method of claim 1, wherein the molar ratio of silica to alumina (SiO2: $Al_2O_3$) in the AEI-type zeolite ranges from 15 to 23 .

16. The method of claim 1, wherein the AEI-type zeolite has an average particle size that is less than 5 micrometers.

17. The method of claim 1, wherein the AEI-type zeolite has a BET specific surface area that is greater than 500 $m^2/g$.

18. The method of claim 1, wherein the AEI-type zeolite exhibits a morphology that includes one or more of cubes, square flakes, irregular particles, or a combination thereof.

19. An AEI-type zeolite prepared according to the method of claim 1.

* * * * *